Figure 1:
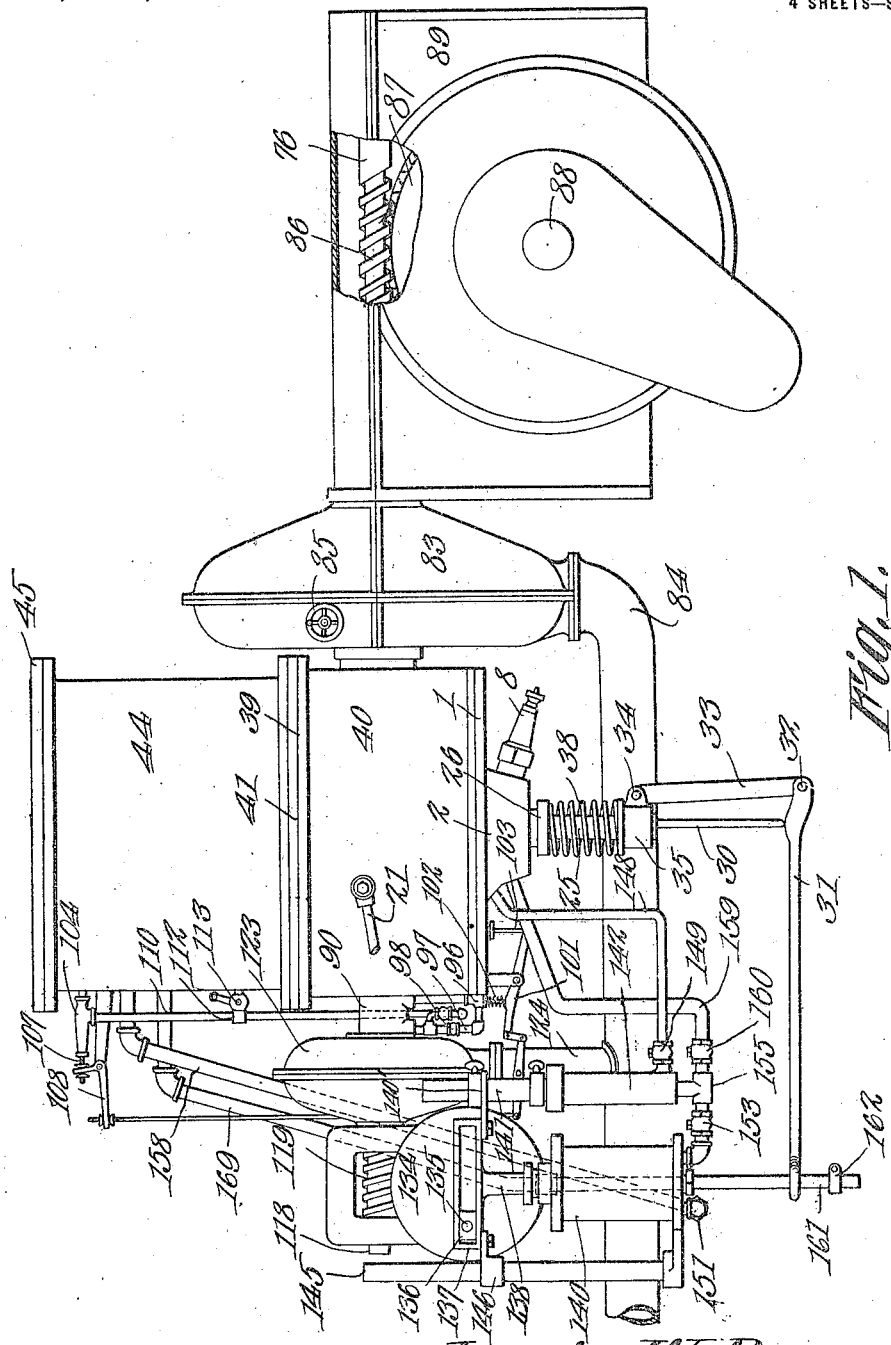

L. W. PENZER.
ROTARY COMBUSTION ENGINE.
APPLICATION FILED NOV. 6, 1914.

1,158,271.

Patented Oct. 26, 1915.
4 SHEETS—SHEET 2.

Witnesses

Louis W. Penzer Inventor,
by
Attorneys.

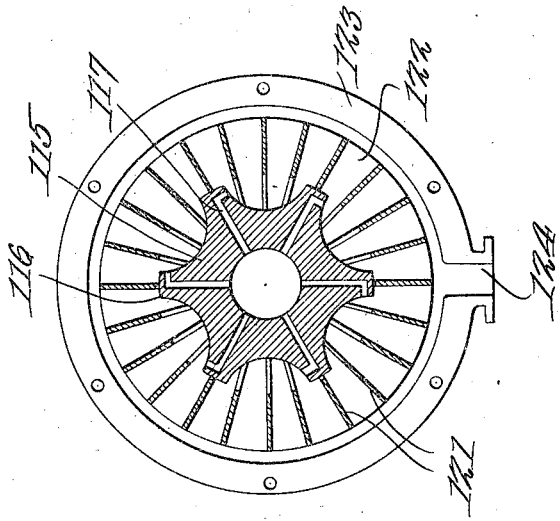
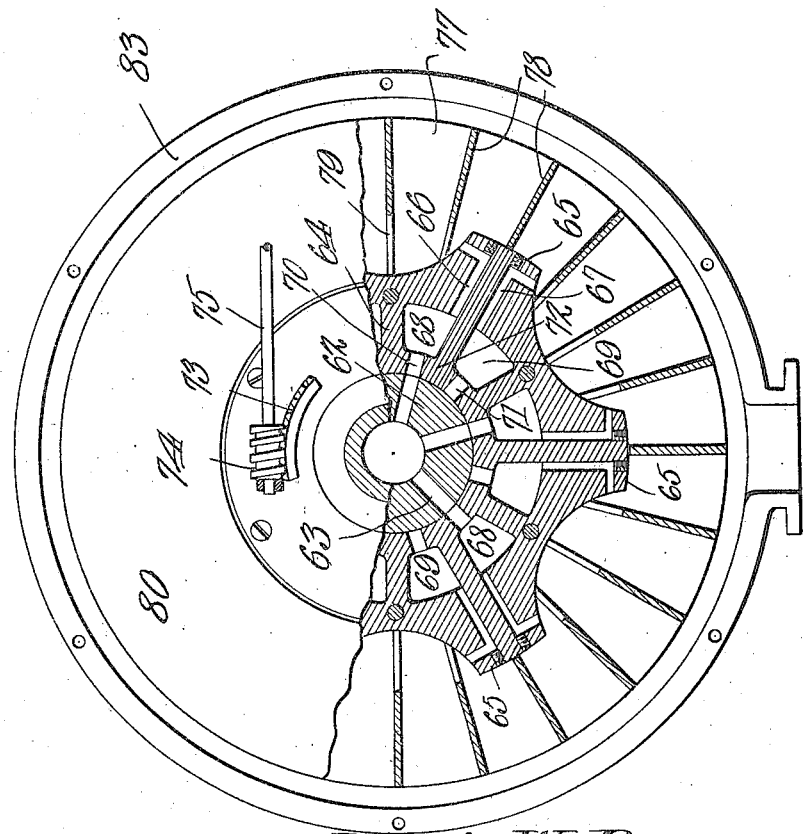

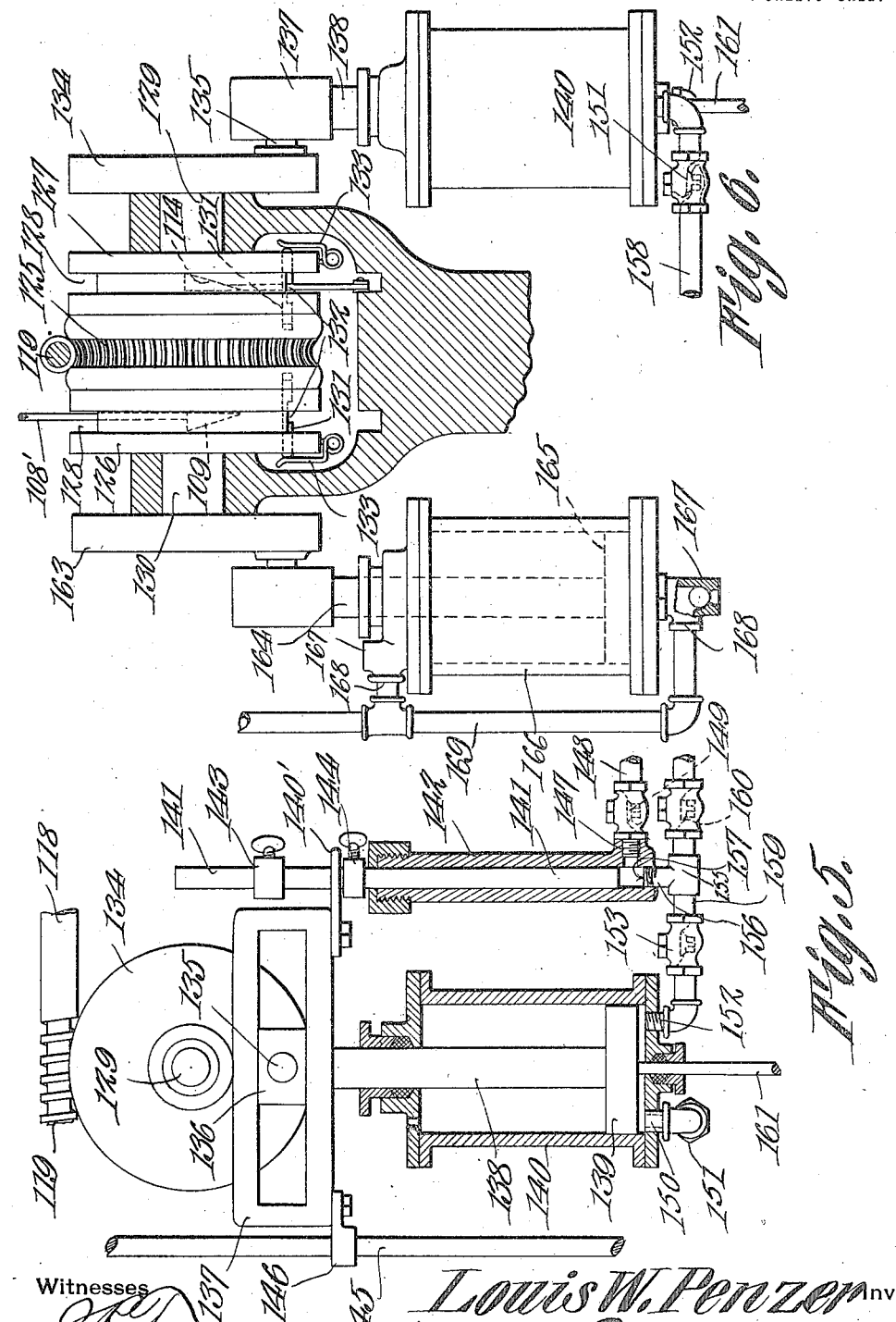

UNITED STATES PATENT OFFICE.

LOUIS WILLIAM PENZER, OF RICHMOND, VIRGINIA, ASSIGNOR OF ONE-HALF TO CHARLES G. HOLLAND, OF RICHMOND, VIRGINIA.

ROTARY COMBUSTION-ENGINE.

1,158,271.  Specification of Letters Patent.  Patented Oct. 26, 1915.

Application filed November 6, 1914. Serial No. 870,685.

*To all whom it may concern:*

Be it known that I, LOUIS WILLIAM PENZER, a citizen of the United States, residing at Richmond, in the county of Henrico and State of Virginia, have invented a new and useful Rotary Combustion-Engine, of which the following is a specification.

This invention relates to an internal combustion engine of the rotary type, one of its objects being to utilize air under pressure as a means for maintaining a constantly uniform pressure upon the rotor of the motor during and between successive explosions of the hydrocarbon gases.

A further object is to provide air under pressure as a means for partly absorbing the force exerted by the rapidly expanding exploding gases, such explosion of the gases resulting in increased compression of the cushioning body of air which is utilized for maintaining a constantly uniform pressure upon the rotor.

A further object is to provide a cushioning body of air which absorbs a large percentage of the heat units and, consequently, assists materially in maintaining the engine in a sufficiently cool condition.

Another object is to utilize means adapted to be operated by the air under compression, for operating the air and gas measuring and injecting mechanism.

A further object is to provide means whereby a measured quantity of water is injected into the pressure chamber of the engine during the explosion of the gases, whereby disintegration of the water is effected by the intense heat generated and an increased expansion of gases within the pressure chamber is produced while, at the same time, freed oxygen commingles with any unconsumed particles of carbon so as to produce complete combustion, the injection of the water into the pressure chamber likewise serving to materially reduce the temperature within the pressure chamber so that, with the use of the exterior body of compressed air, it becomes unnecessary to employ a water jacket or other cooling means such as heretofore devised.

A further object is to provide novel means whereby a confined body of air is placed under increased compression during each explosion of the combustible gases, said compressing means operating to equalize the pressure upon the air and the gases in the pressure chamber so that the rotor driven by said gases will be subjected constantly to a uniform pressure, and not to an intermittent pressure such as would ordinarily be produced by intermittent explosions of gases.

Another object is to provide a novel form of rotor adapted to be driven by jets of exploded gases directed thereagainst, there being a valve of novel form whereby the speed of rotation and the direction of rotation of said rotor can be controlled.

Another object is the utilization of means whereby an explosive mixture will only be directed into the explosion chamber for the purpose of producing an explosion, when the pressure within the pressure chamber of the motor is lowered to a predetermined point, thus effecting a saving of fuel.

Another object is to provide means whereby, when the pressure of air within the motor falls below a predetermined point, said motor will operate automatically to increase the pressure until a predetermined degree of pressure has been reached whereupon the pressure producing means will be automatically cut off or stopped.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

Figure 2:
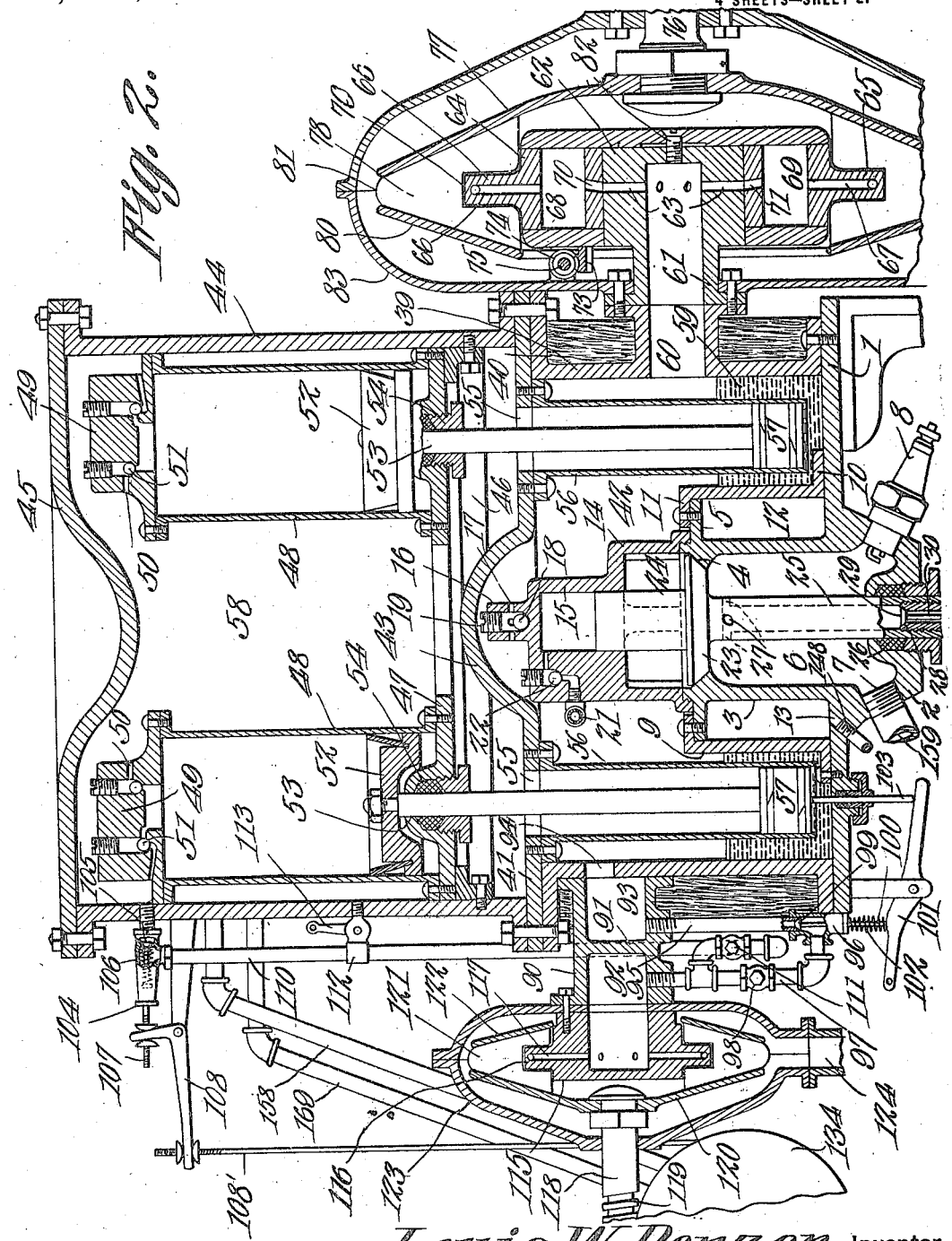

In said drawings:—Figure 1 is a front elevation of the engine constituting the present invention, a portion of the casing of the driven mechanism being broken away. Fig. 2 is an enlarged vertical longitudinal section through the motor, the fuel measuring mechanism being removed and the connection between said mechanism and the exhaust valve being likewise removed. Fig. 3 is a view in elevation of a portion of the inner side of the rotor, the remaining portion of the rotor being shown in section, the rotor casing having its inner side removed. Fig. 4 is a section through the secondary rotor of the motor, one section of its casing being shown in elevation. Fig. 5 is a view partly in section and partly in elevation of the fuel measuring and injecting mechanism. Fig. 6 is a transverse section through the worm driven by the secondary rotor, the parts actuated thereby being shown in elevation.

Referring to the figures by characters of reference 1 designates a circular base plate provided, at its center, with a depending boss 2 and an upstanding cylindrical extension 3, the upper end portion of the extension being provided with an interior valve seat 4 and with an exterior annular flange 5. An explosion chamber 6 is formed within the boss 2 and extension 3 and has an inlet 7 and suitable igniting means such as a spark plug 8. A sleeve 9 extends around and is concentric with the extension 3 and has a base flange 10 which is suitably secured to the base plate 1. A top flange 11 extends from the sleeve and is secured in any suitable manner to the flange 5. Thus an annular compartment 12 constituting a carbureter, is provided around the extension 3 whereby the contents thereof will be heated by conduction through the extension 3 and the sleeve 9, as will be pointed out hereinafter. The carbureter has an outlet port 13.

Secured to and extending upwardly from extension 3 is a spider 14 which supports a plunger casing 15. A nozzle 16 extends upwardly from the plunger casing and has a series of radial outlets 17 while a check valve 18 normally closes communication between the interior of the nozzle 16 and the interior of the plunger casing 15. As shown, the nozzle may be closed at its upper end by a screw plug 19 and, by removing this screw plug the interior of the nozzle can be cleaned readily. The plunger casing has an inlet 20 in communication with a water supply pipe 21 extending into the motor from any suitable point and a check valve 22 is located within the inlet 20 so that back pressure into the pipe 21 is prevented.

A valve 23 is normally positioned on the seat 4 and has a plunger 24 extending upwardly therefrom and fitting snugly within the casing 15. When valve 23 is upon its seat, plunger 24 is positioned with its upper end within the lower portion of casing 15. When, however, valve 23 is unseated, plunger 24 is forced upwardly so as thus to eject a portion of the contents of the casing 15, said contents being expelled radially through the apertures 17.

Valve 23 has a tubular stem 25 extending downwardly through a gland 26 in the center of the boss 2, the interior of the stem communicating through radial openings 27, with the interior of the explosion chamber 6. A valve seat 28 is located within the stem 25 and is normally engaged by a valve 29 bearing downwardly thereon. Valve 29 has a stem 30 which projects downwardly beyond the lower end of stem 25 as shown particularly in Fig. 1 and engages an intermediate portion of a lever 31. One end of this lever is fulcrumed, as at 32, upon a link 33 which, in turn, is pivotally connected, as at 34, to a collar 35 secured to or formed with the lower end portion of the valve stem 25. A coiled spring 38 extends around the lower portion of the valve stem 25 and bears at one end against the collar 35 and at its other end against the gland 26, thus to hold the valve 23 yieldingly upon its seat 4. Valve 29 is likewise normally held upon its seat, it being unnecessary to utilize a spring for this purpose as the pressure of exploding gases within chamber 6 will tend to hold the valve to its seat, as will also the weight of the valve.

Secured upon the peripheral portion of the base plate 1 is the lower cylinder 39 of the engine, said cylinder being preferably surrounded by a jacket 40 of asbestos or other suitable heat resisting material. The cylinder 39 supports a plate 41 which constitutes the head of the pressure chamber 42, which, as shown, is formed between the base plate 1, head 41, and within cylinder 39. This head 41 has a central dome 43 which extends over the plunger casing 15 so that when jets of water are discharged through the openings 17, they will be directed against the lower surface of the dome 43 and converted into a spray which will be quickly disintegrated by the intense heat within the pressure chamber so as to reduce the spray to its component elements, hydrogen and oxygen.

Erected upon the peripheral portion of the head 41 is the upper cylinder 44 of the engine, this cylinder being provided, at its upper end, with a top plate or head 45. Secured within the cylinder 44 near its lower end is a supporting ring 46 on which is mounted a base ring 47. This base ring has one or more cylinders 48 secured thereto and upstanding therefrom, the upper head 49 of each cylinder being provided with outlet ports 50, each of which has a check valve 51 for preventing back pressure into the cylinder 48.

A piston 52 is mounted for reciprocation within each cylinder 48 and each piston has a rod 53 which works within a suitable gland 54 in the base ring 47.

Formed within the head 41 directly below each cylinder 48 is an opening 55 and surrounding each opening 55 is a cylinder 56 which hangs from the head 41 and within the pressure chamber 42, the lower end of each cylinder 56 being open and being supported close to the base plate 1. The longitudinal axes of the corresponding cylinders 48 and 56 coincide and, consequently, each rod 53 extends axially into the cylinder 56 thereunder. Each rod 53 has a piston 57 at its lower end and adapted to work within the cylinder 56.

From the foregoing it will be seen that an air chamber 58 is provided within the upper cylinder 44 of the engine, this air chamber extending through the base ring 47 into the space between said ring and the head 41 and thence downwardly into the depending cylinders 56. There is, however, no communication between the air chamber 58 and the pressure chamber 42.

The bottom portion of the pressure chamber 42 and which is located between the sleeve 9 and the lower portion of the cylinder 39, constitutes an annular container for mercury, shown at 59, this body of mercury extending continuously around the carbureter 12 and the lower ends of the cylinders 56 being submerged within the mercury as shown in Fig. 2.

The cylinder 39 of the engine has an outlet port 60 and this port discharges into the tubular stem 61 of a hub 62. This hub is cylindrical, as shown particularly in Fig. 3 and is provided with a plurality of radial ports 63 communicating with the interior of the hub and of the stem 61.

Mounted for rotation on the hub is a valve 64 having a series of spaced nozzles 65 extending from its periphery at the center thereof, each nozzle being provided with non-communicating outlet passages 66 and 67, and these passages have their outlet ends extended in opposite directions, as shown. A pair of cells 68 and 69 is provided within the valve for each pair of passages 66 and 67, each passage 66 being extended from a cell 68, while each passage 67 is extended from a cell 69. Cell 68 has an inlet port 70, while cell 69 has an inlet port 71. The two ports 70 and 71 are spaced by an imperforate wall 72 fitting snugly against the hub 62.

The ports 70 and 71 are so positioned relative to each other and to the radial ports 63 in the hub 62 that, when the valve is rotated a short distance in one direction, to the position shown in Fig. 3, the imperforate wall 72 will be brought to position across the ports 63 so as to close communication between said ports and the cells 68 and 69. When, however, the valve is rotated so as to bring the ports 63 into communication with ports 70, gases escaping from the hub will flow into the cells 68 and thence into the passages 66 so that they will be expelled in jets flowing in a counter-clockwise direction. When, however, the valve is rotated in the opposite direction, the ports 71 will be brought into register with ports 63 and the gases under pressure will thus flow into the cells 69 and passages 70 so that the jets will be expelled from the valve in a clockwise direction.

In order that the valve may be actuated readily for shifting it to any one of its three positions, to wit, forward, stop and reverse, a toothed segment 73 is secured to each side of the valve and is constantly engaged by a worm 74 secured to an actuating stem 75 which projects to a point where it can be easily reached and rotated.

The main rotor of the engine is secured to the driven shaft 76 and preferably includes a concaved disk 77 which partly incloses the valve 64 and the hub 62. Wings 78 are extended from the concaved face of the disk 77 and extend close to the periphery of the valve, each wing being preferably substantially triangular and having a recess 79 through which the nozzles 65 of the valve are adapted to work. The blades or wings 78 are radially disposed and those edges thereof remote from disk 77 are preferably connected and reinforced by a ring 80, the periphery of the said ring being spaced from the periphery of the disk 77 so that orifices 81 are provided between the outer ends of the blades or wings 78 for the escape of spent gases. The main rotor and the valve 64 obviously rotate about a common axis.

As shown in Fig. 2, the valve 64 is held against displacement relative to the hub 62 by means of a pivot bolt 82, although it is to be understood that any other means may be employed for this purpose.

In order that the spent gases may be collected and conveyed to a point remote from the engine, a casing 83 is erected around the rotor, the hub 62 and the valve 64, this casing communicating with an exhaust pipe 84. The stem 75 of the adjusting worm is extended through one wall of the casing and may be provided with a hand wheel 85 or any other suitable means whereby adjustment of the valve 64 can be effected readily.

Shaft 76 can be provided with a worm 86 engaging a gear 87 secured to a shaft 88 and it is preferred to house this gear 87 and its worm 86 within a casing 89, as shown particularly in Fig. 1.

Extending from the lower cylinder 39 is a casing 90 having an intermediate partition 91 which divides the interior of the casing into separate compartments 92 and 93, respectively. Compartment 93 communicates with the pressure chamber 42 through a port 94 formed in the cylinder 39 and a pipe 95 extends from this compartment 93 into a valve casing 96. A pipe 97 connects valve casing 96 to the compartment 92 and this pipe 97 is provided with a check valve 98, whereby back pressure through the pipe and toward the valve casing 96 is prevented.

A valve 99 is arranged within the casing 96 and operates normally to close communication between pipe 97 and pipe 95, this valve being provided with a stem 100 pivotally connected to one arm of a lever 101. A spring 102 may be connected to this lever for holding valve 99 yieldingly upon its seat. The other arm of lever 101 supports a pin 103 which is slidably mounted within the base plate 1 and projects into the path of one of the pistons 57. Thus when said piston 57 arrives in its lowermost position within its cylinder 56, it will push against pin 103 and cause lever 101 to rock against the action of spring 102, thus unseating valve 99 and establishing communication between the interior of the pressure chamber 42 and the chamber 92.

A valve casing 104 is in communication with the upper portion of the interior of air chamber 58 and this casing has a valve 105 against which bears a spring 106. This spring serves to open the valve when the pressure within the chamber 58 is brought below a predetermined point or degree. A stem 107 moves with the valve and transmits motion through a bell crank lever 108 and a rod 108' to a wedging element 109 provided for the purpose hereinafter set forth.

A pipe 110 extends from the casing 104 and opens into the pipe 97 at a point between the chamber 92 and the check valve 98, there being a check valve 111 within the pipe 110 for the purpose of preventing back pressure within said pipe from the chamber 92.

A by-pass 112 connects pipe 110 with the air chamber 58 and contains a starting valve 113, this starting valve being normally closed.

A wedging element 114 may be connected in any suitable manner to the lever 101 and is for the purpose hereinafter set forth.

The outer end of the casing 90 is bolted or otherwise secured to a hub 115 the outer end of which is closed, the interior of said hub communicating with the compartment 92 in the casing 90. This hub has a series of outstanding nozzles 116 on its periphery, each nozzle being provided with a radial passage 117 communicating with the interior of the hub and provided, at its outer end, with an outlet for directing a jet of fluid from the hub substantially at a tangent thereto.

A driven shaft 118 having a worm 119, is provided with a secondary rotor including a concaved disk 120. This disk partly incloses the hub 115 and has substantially triangular blades or wings 121 secured to its concaved face, the inner edges of the wings or blades being connected by a ring 122. These blades or wings 121 are shaped similarly to the blades or wings 78 so as to straddle the nozzles 116 and to provide vents for exhausted gases between the disk 120 and the ring 122. A housing 123 incloses the secondary rotor and has an outlet 124 for the exhaust, this outlet discharging into the pipe 84.

The worm 119 constantly engages a worm gear 125 which is interposed between and rotates independently of two separately movable disks 126 and 127, each of these disks being provided with an annular groove, as shown at 128. A shaft 129 rotates the disk 127 and another shaft 130 rotates with disk 126. Intersecting each groove 128 is a coupling pin 131 having a recess 132 normally partly exposed within the groove 128. A spring 133 bears against each coupling pin and serves to project the pin laterally from the disk and into engagement with one side of the worm gear 125. The wedging element 109 is so mounted as to project into the groove 128 in disk 126 while the wedging element 114 is so positioned as to project into the groove 128 in disk 127. The parts are so mounted that when the valve 105 is seated, the wedging element 109 is forced into the path of the pin 131 carried by disk 126 so that as said disk rotates with the gear 125, the wedging element is received within the recess 132 in said pin and forces the pin outwardly from engagement with the gear 125 so that the disk 126 and the parts actuated thereby will not be driven. When, however, the valve 105 becomes unseated under the action of its spring 106, the foregoing action will be reversed, the wedging element being withdrawn from groove 128 so that pin 131 will be free to spring into engagement with the gear 125 and disk 126 thus caused to rotate with the gear.

Wedging element 114 is so positioned and mounted that, when pin 103 is forced downwardly by piston 57 and lever 101 is actuated against the action of spring 102, said wedging element is withdrawn from engagement with the coupling pin 131 carried by disk 127 and the said coupling pin is thus free to shift into engagement with gear 125 so that disk 127 will rotate with the gear. When, however pin 103 moves upwardly, thus releasing lever 101, the wedging element 114 will move into the path of the pin 131 carried by disk 127 so that the said wedging element will be received within the recess 132 and pin 131 will be withdrawn from engagement with gear 125 and disk 127 will be brought to a stop independently of the gear 125.

The shaft 129 which rotates with disk 127 carries a disk 134 provided with a wrist pin 135 on which a block 136 is pivotally mounted. This block is movably mounted within a cross head 137, said cross head being connected to one end of a rod 138 projecting from a piston 139. Said piston is mounted for reciprocation within an air cylinder 140 and, consequently, the rotation of disk 134 will result in the reciprocation of piston 139. A tappet 140' moves with the cross head and upon a plunger 141 designed to reciprocate within a gas cylinder 142. Adjustable stop collars 143 and 144 are mounted on the plunger above and below the tappet 140', respectively, it being possible, by the adjustment of these stop collars, to cause the tappet 140' to raise and to lower the plunger 141 after the piston 139 has moved a predetermined distance upwardly and downwardly respectively.

A guide rod 145 may be arranged adjacent the path of the cross head 137, this rod being slidably engaged by an ear 146 secured to and extending from the cross head.

The gas cylinder 142 has an inlet port 147 communicating, through a pipe 148, with the outlet port 13 of the carbureter. A check valve 149 is located between these ports 147 and 13 so that back pressure from the cylinder 142 to the carbureter 12 is prevented.

Air cylinder 140 has an inlet port 150 provided with a check valve 151. This cylinder is likewise provided with an outlet port 152 provided with a check valve 153, said port communicating, through a pipe 154, with a T fitting 155. This T fitting communicates, through branch 156, with the outlet port 157 of the gas cylinder 142. A pipe 158 extends from port 150 to air chamber 58. A pipe 159 leads from the casing 155 to the port 7 of the explosion chamber and this pipe contains a check valve 160 whereby back pressure within the pipe from the explosion chamber is prevented.

From the foregoing description it will be apparent that warm air is admitted to cylinder 140 under pressure from chamber 58 and during one complete rotation of the disk 134, piston 139 will force this warm air outwardly through the port 152 and through pipe 159 and thence into the explosion chamber 6 when the valve 23 is held normally upon its seat by the pressure in chamber 42. A rod 161 is connected to and depends from the piston 139 and has a collar 162 which loosely engages one end of the lever 31. Consequently, during the last portion of the upward movement of piston 139, the lever 31 will be lifted by collar 162 so as to raise the stem 30 and valve 29, thus allowing spent gases within the chamber 6 to escape outwardly through the valve stem 25. Then during the downward stroke of piston 139 valve 29 will be kept open while a portion of the air is forced by the piston through the explosion chamber. As the collar 162 leaves the lever during this down stroke of the piston valve 29 closes and while air is still being forced into the explosion chamber it will not escape. Moreover, during the upward movement of piston 139 the piston 141 is elevated by the tappet 140' so that a predetermined quantity of gas is sucked from the carbureter into the cylinder 142. Consequently during the descent or return stroke of the piston 139 after fresh air has been directed into the engine, gas is expelled from the cylinder 142 by the descending plunger 141 and is forced through fitting 155 and pipe 159 into the explosion chamber 6 where a thorough mixture of the gas and air is completed.

Any suitable means, not shown, may be provided for producing a spark within the explosion chamber immediately subsequent to the injection of a combustible mixture into said chamber.

A disk 163 is driven by shaft 130 and has means similar to that shown in Fig. 5 and heretofore described, for transmitting motion to a piston rod 164, this piston rod operating a pump piston 165 within an air or pump cylinder 166. This cylinder has inlets 167 at its ends and provided with suitable check valves and is also provided at each end with an outlet 168 provided with a check valve, the two outlets communicating with a pipe 169 which discharges into the air chamber 58 in the upper portion of the engine.

Assuming that the carbureter is supplied with a suitable hydrocarbon, starting valve 113 is closed and air is forced into the chamber 58 by means of a hand pump or in any other suitable manner until the pressure within said chamber has reached approximately 80 pounds to the square inch. This pressure is sufficient to hold the valve 105 upon its seat against the action of spring 106 and to hold the wedging element 109 in engagement with its pin 131 so that the disk 126 controlling the air pump is thus held uncoupled from gear 125. The pressure of air within chamber 58 will force the pistons 57 downwardly, one of the pistons pushing through pin 103 on lever 101 so that said lever operates to withdraw the wedging element 114 from engagement with the pin 131 carried by disk 127. Consequently said disk is coupled to the gear 125 and will rotate therewith.

By opening the starting valve 113, air under pressure is permitted to flow from the chamber 58 to pipe 110 and thence past by-pass 111 into chamber 92 and this air will issue in jets from the passages 119 and against the wings or blades 121 so as to drive the secondary rotor and cause motion to be transmitted from worm 119 to gear 125. Consequently the disk 127 which is coupled to the gear will be rotated and the air and gas forcing pistons 139 and 141 will be actuated to direct an explosive mixture into the chamber 6. As soon as the secondary rotor has been started in the manner described, the valve 113 can be closed for the reason that the reduced pressure within chamber 58 will result in the opening of valve 105 and the consequent withdrawal of wedging member 109 from its pin 131. This obviously will result in the coupling of disk 126 to gear 125 so that the pump piston 165 will be actuated and a new supply of air forced into the chamber 58 so that the pressure of air within this chamber will be maintained practically uniform.

When the explosive mixture is discharged into chamber 6, it will be exploded automatically and the expansion of the gases thus produced will result in lifting valve 23 from its seat and the escape of the expanded gases into the pressure chamber 42 where further expansion will result from the injection of water through the openings 17 by the plunger 24, this water being disintegrated and the oxygen combining with the unconsumed carbon so as to result in complete combustion. The force of the expanded gases within the pressure chamber 42 is exerted upon the surface of the mercury 59 and into the hub 62, the gas escaping through the ports 63 in the hub being adapted to discharge in the form of jets against the wings or blades 78 of the main rotor so as to drive said rotor in one direction or the other according to the position of the valve 64. However, if the valve is in closed position, the gases will not of course escape through the hub 62. The pressure exerted by the expanded gases upon the mercury will result in the elevation of the pistons 57 and this elevation will be retarded by those pistons 52 which are located in the cylinders 48. In other words, the upper pistons 52 and their cylinders coöperate to form dash pots for absorbing the shock produced by the explosion of the gases and their sudden expansion within the pressure chamber 42. Furthermore, as soon as the explosion has been produced and the pistons 57 forced upwardly, said pistons will begin to move downwardly under the pressure of air upon the upper faces of the pistons 57 so that the gases within the chamber 42 will be maintained practically under the same degree of compression between explosions as during the explosion. This results in a constant or uniform pressure of gas through the ports 63 of the rotor so that said rotor is driven with uniform power.

As before pointed out, the air pump is set in operation as soon as the pressure of air within chamber 58 is reduced below a predetermined degree and this air pressure serves normally to hold the pistons 57 in their lowermost position, at which time they press through pin 103 upon lever 101 and cause said lever to lift valve 99 off of its seat so that gas under pressure is free to flow from the pressure chamber 42 into the chamber 93 and thence by way of pipes 95 and 97 into chamber 92 from which the gas is discharged through the passages 117 against the blades 121 of the secondary rotor so as thus to drive said rotor. Whenever the pressure of air within the chamber 58 drops below normal, the pressure in chamber 42 will force the pistons 57 upwardly, thus causing valve 99 to close and at the same time the valve 105 will open and a portion of the air in the chamber 58 will thus be utilized to drive the secondary rotor. The air pump for replenishing the air chamber 58 is only operated of course when the valve 105 is open, as hereinbefore described and the fuel measuring and injecting mechanism is only operated by the secondary rotor when the pressure in chamber 42 is reduced to such an extent as to permit the pistons 57 to assume their lowermost positions.

A résumé of the operation of the engine will show that air pressure in chamber 58 is used to start the secondary rotor, couple the mixer thereto and to shut off the pressure of gas from pressure chamber 42 to the rotor; that the pressure of gas within the chamber 42 resulting from the explosion of fuel, results in forcing pistons 57 upwardly, establishing communication between the pressure chamber and rotor to drive the rotor, and uncoupling the mixer from the rotor; and that when the pressure of the gases within chamber 42 is reduced, the pistons 57 descend under the pressure of the air in the chamber 58, which pressure is maintained practically constant, thus closing the communication between the chamber 42 and the rotor and coupling the fuel mixing and injecting mechanism to the secondary rotor.

As a result of the operation which has been described, an explosive mixture is discharged into the engine only after the pressure in chamber 42 has reached its lowest possible working basis, whereupon another explosion in the engine is produced so as to increase the pressure. This obviously results in a great saving of fuel inasmuch as explosions only take place as needed to maintain a predetermined pressure in the engine. Furthermore, the use of the pistons 57 with their buffers or shock absorbers, results in the absorption of undesirable jarring produced by the explosion and maintains the gas in chamber 42 constantly under a uniform pressure both during and between explosions, so that the main rotor will be driven with the same force at all times.

What is claimed:—

1. In an internal combustion engine, a pressure chamber, an air chamber, means operated by the expansion of gases within the pressure chamber, for increasing the compression of air within the air chamber and means for feeding fuel to the engine when the pressure in the engine is below a predetermined degree and for cutting off the feed when the said pressure is above a predetermined degree.

2. In an internal combustion engine, a pressure chamber for the reception of expanded gases, an air chamber, means for maintaining the contents of the two chambers under substantially the same compression. and means for automatically feeding fuel to the engine when the pressure in the engine is below a predetermined degree and for cutting off the feed when said pressure is above a predetermined degree.

3. In an internal combustion engine, a pressure chamber for the reception of expanded gases, an air chamber, means for maintaining the contents of the two chambers under substantially the same compression, a rotor operated by pressure from the pressure chamber, fuel feeding means coupled thereto, and means operated by the expansion of gases within the pressure chamber for uncoupling said feeding means from the rotor.

4. An internal combustion engine including a pressure chamber, an air chamber, means operated by the expansion of gases within the pressure chamber for increasing the compression of the contents of the air chamber, a rotor, fuel feeding means coupled thereto, means for directing air from the air chamber to initially propel the rotor, means for directing gas and fluid under pressure from the pressure chamber to the rotor subsequent to the initial starting of the rotor, means operated by the expansion of gases within the pressure chamber for uncoupling the rotor from the fuel feeding means, and means operating upon the reduction of pressure within the pressure chamber to a predetermined degree, for coupling the rotor to the fuel feeding means.

5. In an internal combustion engine, a pressure chamber, an air chamber, means operated by the expansion of gases within the pressure chamber for increasing the pressure of air within the air chamber, a rotor, means for directing compressed air into the rotor to impart an initial movement thereto, fuel feeding means coupled to the rotor, means for directing gases under compression from the pressure chamber to the rotor subsequent to the initial movement of the rotor, and means controlled by the pressure in the engine for automatically uncoupling the rotor from the fuel feeding means when the pressure is above a predetermined degree and for automatically coupling said feeding means to the rotor when the pressure is below a predetermined degree.

6. In an internal combustion engine, a pressure chamber, an air chamber, means for equalizing pressures within the two chambers, a pressure driven element, a fuel feeding means coupled thereto, means for directing fluid under pressure from the pressure chamber to the rotor, means operated by the pressure when above a predetermined degree for uncoupling the feeding means from the pressure driven element and, when below a predetermined degree for coupling the feeding means to the pressure driven element, and means for automatically directing air under pressure to the rotor when said pressure falls below the predetermined degree.

7. In an internal combustion engine, a pressure chamber, an air chamber, means for equalizing pressure upon the contents of the two chambers, a rotor, means for directing pressure to the rotor from the pressure chamber, fuel feeding means coupled to the rotor, means for automatically uncoupling the rotor from the feeding means when the pressure is above a predetermined degree and for coupling the rotor to said feeding means when the pressure is below a predetermined degree, means for directing air under pressure to the rotor when said pressure is below a predetermined degree, an air pump, and means for automatically coupling the pump to the rotor when the air pressure is below a predetermined degree.

8. An internal combustion engine including a pressure chamber, an air chamber, means for equalizing pressures within said chambers, a rotor, fuel feeding means coupled to the rotor, means for directing air under pressure to the rotor to initially drive the rotor, means operated by the rotor for automatically restoring the pressure within the air chamber when said pressure drops below a predetermined degree, means for automatically uncoupling the fuel feeding means from the rotor when pressure in the pressure chamber rises above a predetermined degree and for coupling the rotor to the feeding means when the pressure falls below said predetermined degree, a main rotor, and separate means for directing pressure to the respective rotors.

9. In an internal combustion engine, a pressure chamber, an air chamber, means operated by the expansion of gases within the compression chamber for increasing the compression of air in the air chamber, whereby the pressures in the two chambers are equalized during the expansion of gases within the pressure chamber, a rotor, means for directing gases under pressure from the pressure chamber to the rotor, fuel feeding means coupled to the rotor, means for automatically uncoupling said feeding means from the rotor when the pressure of gas within the pressure chamber rises above a predetermined degree and for coupling the rotor to the feeding means when the pressure drops below said predetermined degree, a main rotor, and means for directing gases under pressure from the pressure chamber to the main rotor.

10. An internal combustion engine including a pressure chamber, an explosion chamber, a valved connection between the explosion and pressure chambers, a rotor, means for directing expanded gases from the pressure chamber to the rotor, and means for maintaining uniform compression of gases within the pressure chamber during and between explosions.

11. In an internal combustion engine, a pressure chamber, an explosion chamber, a valved connection between said chambers, an air chamber, means operated by the expansion of exploded gases within the pressure chamber for increasing the compression in the air chamber, whereby the compression of the gases in the pressure chamber between the explosions is maintained, a rotor, and means for directing gases under pressure to the rotor from the pressure chamber.

12. An internal combustion engine including a pressure chamber, an air chamber, a cylinder communicating with the air chamber and depending within the pressure chamber, said cylinder having its lower end open, a fluid within the pressure chamber and in which the lower end of the cylinder is submerged, a piston working within said cylinder, a cylinder within the air chamber and discharging thereinto, a piston within said last named cylinder, and a connection between the pistons, said pistons and fluid constituting means for transmitting pressure from the pressure chamber to the contents of the air chamber during the expansion of gases within the pressure chamber.

13. An internal combustion engine including a pressure chamber, a chamber for holding a confined body of air, and means for transmitting pressure from the pressure chamber to said body of air, said means including a cylinder in communication with said air holding means and having a lower open end, a fluid within which said open end is submerged, said fluid being exposed to receive the pressure of expanding gas within the pressure chamber, a cylinder within the air holding means, a piston within said last named cylinder, and a connection between the cylinders.

14. An internal combustion engine including a pressure chamber, a chamber for holding a confined body of air, and means for transmitting pressure from the pressure chamber to said body of air, said means including a cylinder in communication with said air holding means and having a lower open end, a fluid within which said open end is submerged, said fluid being exposed to receive the pressure of expanding gas within the pressure chamber, a cylinder within the air holding means, a piston within said last named cylinder, a connection between the cylinders, a rotor, and means for directing gases under pressure from the pressure chamber to the rotor.

15. In an internal combustion engine, a pressure chamber, an explosion chamber, a valve normally closing communication between said chambers, said valve being adapted to be opened under the force of the exploding gases, and means operated by the unseating of the valve for injecting water into the pressure chamber.

16. An internal combustion engine including a pressure chamber, an explosion chamber, a valve normally closing communication between said chambers and adapted to open under the force of the exploding gases, a water container, and means operated by the valve during its movement to open position, for injecting water into the pressure chamber.

17. An internal combustion engine including a pressure chamber, an explosion chamber, a valve normally closing communication between said chambers and adapted to open under the pressure of exploding gases, a casing within the pressure chamber, means for supplying water thereto, a spraying nozzle in communication with the casing, and means operated by the movement of the valve to open position, for ejecting water through the casing and into the pressure chamber.

18. In an internal combustion engine, the combination with a pressure chamber having a dome, an explosion chamber, and a valve normally closing communication between said chambers, said valve being adapted to open under the pressure of exploding gases, of a casing within the pressure chamber, a nozzle extending therefrom, means for supplying water to the casing, and means operated by the movement of the valve to open position, for directing water through the nozzle and against the dome.

19. In an internal combustion engine, the combination with a pressure chamber, and an explosion chamber projecting thereinto, of a carbureter surrounding said explosion chamber and within the pressure chamber, a pressure operated rotor, fuel mixing and feeding means including means for withdrawing gas from the carbureter and means for mixing said gas with air and injecting it into the explosion chamber, means operating upon the reduction of pressure to a predetermined degree within the pressure chamber for coupling said mixing and feeding means to the rotor, an exhaust extending from the explosion chamber, and means operated by said feeding and mixing means for successively opening and closing the exhaust prior to the admission of fuel to the explosion chamber.

In testimony that I claim the foregoing as my own, I have hereto affixed my signature in the presence of two witnesses.

LOUIS WILLIAM PENZER.

Witnesses:
 HUGH DENVER,
 A. G. ROGERS.